US005338180A

United States Patent [19]

Maule

[11] Patent Number: 5,338,180

[45] Date of Patent: Aug. 16, 1994

[54] APPARATUS FOR THE PRODUCTION OF BRICKS AND THE LIKE

[76] Inventor: Alexander Maule, 675 Inverary Road, Burlington, Ontario, Canada, L7L 2L8

[21] Appl. No.: 754,852

[22] Filed: Sep. 4, 1991

[30] Foreign Application Priority Data

Sep. 6, 1990 [CA] Canada .................... 2024735

[51] Int. Cl.[5] .................... B29C 47/12

[52] U.S. Cl. .................... 425/466; 425/381; 425/467

[58] Field of Search .................... 425/467, 466, 381

[56] References Cited

U.S. PATENT DOCUMENTS 1,906,744 5/1933 Frandsen .................... 425/466
4,464,104 8/1984 Gneuss .................... 425/467
4,708,837 11/1987 Baxter .................... 425/466

FOREIGN PATENT DOCUMENTS 441093 2/1927 Fed. Rep. of Germany ...... 425/467

*Primary Examiner*—James Derrington

*Attorney, Agent, or Firm*—Rogers & Scott

[57] ABSTRACT

In the production of kiln fired bricks and hollow structural tiles a substantial loss (about 3.5%-7%) occurs during drying and firing, principally in the bottom layers adjacent the kiln car deck. This can be minimized by reducing the size of the core holes in the bottom rows of bricks, large holes being maintained in the upper layers to reduce the load on the bottom bricks, economising in fuel and clay. The method and apparatus involve use of a longitudinally movable core plug for each hole produced the downstream end portion of which produces small holes while an upstream portion produces large holes, the shape being such that in cooperation with the extrusion nozzle uniform flow and compression are maintained to equalise final column swell sizes as much as possible for both large and small core hole brick preforms. The pressure of the clay flow can move the plug to the position for the production of large core holes, while an automatic controlled motor means move the core plugs to the position for the production of small core holes. the core plug can be moved to the position in which the smaller core hole size becomes zero for the production of solid "paver" bricks.

13 Claims, 8 Drawing Sheets

FIG.6

APPARATUS FOR THE PRODUCTION OF BRICKS AND THE LIKE

FIELD OF THE INVENTION

This invention is concerned with methods and apparatus for the production of kiln-fired bricks and like products, such as pavers and hollow structure tiles.

REVIEW OF THE PRIOR ART

The mass production of bricks and hollow structure tiles by extruding pugged clay from an extruder in the form of a rectangular cross-section strip that is cut transversely into individual green brick preforms is now a well-established process in the industry. To key together the laid rows of bricks by the interposed mortar, and also to reduce weight and the amount of clay required per brick, it is usual to provide the bricks with at least one, more usually three, and sometimes as many as ten, core holes or passages that when the bricks are laid will extend vertically through the brick between the two horizontal bearing faces. In a continuous process the green, relatively fragile brick preforms are stacked onto a kiln car in the form of a number of separate so-called "hacks", usually about 8–18 layers high, and the stacked car is passed through a a drier and a firing kiln from one end to the other, the temperature profile along the length of the kiln and the speed of movement of the car being such that during this single pass the green preforms are subjected to the firing cycle to obtain the finished vitrified condition required.

In Canada there is a C.S.A. (Canadian Standards Association) Standard A82.1-M87 that states (Section 10.1) that the net cross-sectional area of a cored brick in any plane parallel to the bearing surface shall be at least 75% of the gross cross-sectional area measured in the same plane, while no part of any hole shall be less than 19 mm (0.75 in.) from any edge of the brick. The standard also includes tables of maximum permissible variations in tolerances for overall dimensions, warpage, and chippage from the edges and corners. Once a loaded car has been committed to the kiln it is not practical to inspect the condition of the bricks during transport or to stop the car if a problem should arise, and it is therefore important to ensure that problems do not develope at this stage.

One problem always encountered is that large or maximum-cored green bricks in the bottom layers of the hacks are subjected both in the dryer and the kiln to transverse stresses owing to differential movements between them and a layer of refractory blocks on which they are stacked on the kiln car, as well as to the load of the superimposed layers, and as a result of these stresses tend to warp, crack and chip, and may even collapse completely, destroying the hack and spilling at least some of the preforms from the car. One solution to this problem that has been proposed is to reduce the total cross-sectional area of the core holes in the bottom layers only, so that the bearing capacity of those preforms is increased correspondingly, while maximum core size is maintained in the upper layers to obtain maximum economy of weight, fuel and clay consumption. It is found in practice that it is usually sufficient for only the bottom two layers to have reduced core holes, so that only about 11%–15% of the total number of bricks are affected, and that a reduction to about 13%–18% of the gross cross-sectional area is usually acceptable. One process of producing such a mixed-cored stack of which I am aware involved the use of two separate extruders for the two different core hole sizes, rather than attempting to change the core size of a single extruder while the extruder is operative. However, since most brick clays that are used are treated with additives to accelerate and increase the green strength, improve setting and resistance to mechanical handling it is not practical to use a separate extruder to produce small cored green brick on an intermittent basis. While the small core hole extruder is shut down with the large hole extruder producing the bulk of the brick, the clay in the small hole extruder system hardens and when small hole brick are required for the setting an inconsistant column is produced making brick quality very poor. This two extruder arrangement is also very expensive to install.

One further process of producing such a mixed core stack of which I am aware involves the use of a device, designed for fast die or brick size changes, wherein two die sets are set on slides in front of the extruder and moved laterally by hydraulic action, one die set being equipped with large core opening die members and the other with small core opening die members. This arrangement in practice would have the same problems as the previously-described method of extrusion inconsistancy due to clay hardening in one die set as the other is in use, plus the problem of breaking the clay column produced and having to insert the new column end through texturing and colouring equipment and thereafter readjusting such equipment. However, despite the availability of these "mixed-cored" solutions, the majority of brick manufacturers continue to use only large cored green bricks and to accept damage and spoilage rates as high as 7% of the total bricks produced.

DEFINITION OF THE INVENTION

It is an object therefore of the invention to provide a method and apparatus for the continuous production from a single extruder of green brick preforms in which the size of the core holes can be varied in production from zero to any desired predetermined value or values.

In accordance with the present invention there is provided a new method for the production of bricks and the like including the steps of:

extruding a continuous strip of clay through a nozzle outlet having therein at least one core opening die member, each adapted to produce a respective core hole of both smaller and larger transverse dimension, which smaller dimension may be zero, in dependence upon its longitudinal position relative to the nozzle outlet; and cutting the extruded strip into individual green preforms and stacking the green preforms on the refractory deck of a kiln car for movement through the interior of a drier and firing kiln to effect the drying and firing thereof to produce fired bricks; and wherein the core opening die member is positioned rearward to produce smaller core holes and forward to produce larger core holes.

Also in accordance with the invention there is provided a new apparatus for use in the production of bricks and the like and for use in combination with an extruder conveyor having an outlet for clay material from which green preforms of the bricks and the like are to be made, the apparatus comprising:

a nozzle member having a nozzle outlet and for connection to the extruder conveyor outlet for the extrusion through the nozzle outlet of a continuous strip of clay which subsequently is divided into individual green preforms;

a core opening die member mounted in the nozzle member for longitudinal movement therein, the member being adapted to produce when in a second position at or adjacent to the nozzle outlet a core hole of corresponding size and when in a first position upstream of the second position to produce a core hole of corresponding size which may be zero; and motor means connected to the core opening die member for longitudinal movement thereof between the first and second positions at or adjacent to the nozzle outlet at which it produces respectively the core holes of different sizes.

Further in accordance with the invention there is provided a core opening die member for use in apparatus for the production of cored bricks and the like, the apparatus comprising a clay extruder having a nozzle member with a nozzle outlet within which the die member is disposed and from which issues a continuous strip of cored clay, the die member comprising:

a first downstream portion of transverse cross-section size and shape to produce when positioned at or adjacent to the nozzle outlet a core hole of smaller size;

a second upstream portion longitudinally spaced from the first downstream portion and of transverse cross section and shape to produce when positioned at or adjacent to the nozzle outlet a core hole of larger size; and an intermediate portion connecting the said first and second portions and of progressively increasing cross-section area upstream from the first to the second portion.

Further in accordance with the invention there is provided apparatus for use in the production of bricks and the like and for use in combination with an extruder conveyor having an outlet for clay material from which green preforms of the bricks and the like are to be made, the apparatus comprising:

a nozzle member having a nozzle outlet and a nozzle inlet and for connection to the extruder conveyor outlet for the extrusion through the nozzle outlet of a continuous strip of clay which subsequently is divided into individual green preforms;

a core opening die member mounted in the nozzle member for longitudinal movement therein, the member having a first and second portions adapted to produce when positioned at or adjacent to the nozzle outlet respective core holes of smaller and larger sizes; and a conical intermediate connecting member interposed between the conveyor outlet and the nozzle inlet, having an inlet at the conveyor outlet and an outlet at the nozzle inlet, and of progressively decreasing transverse cross-section clay flow area from the its inlet to its outlet maintaining corresponding flow therein of the clay.

DESCRIPTION OF THE DRAWINGS

Particular preferred embodiments of the invention will now be described, by way of example, with reference to the accompanying diagrammatic drawings, wherein.

DESCRIPTION OF THE PREFERRED EMBODIMENTS

Figure 1:
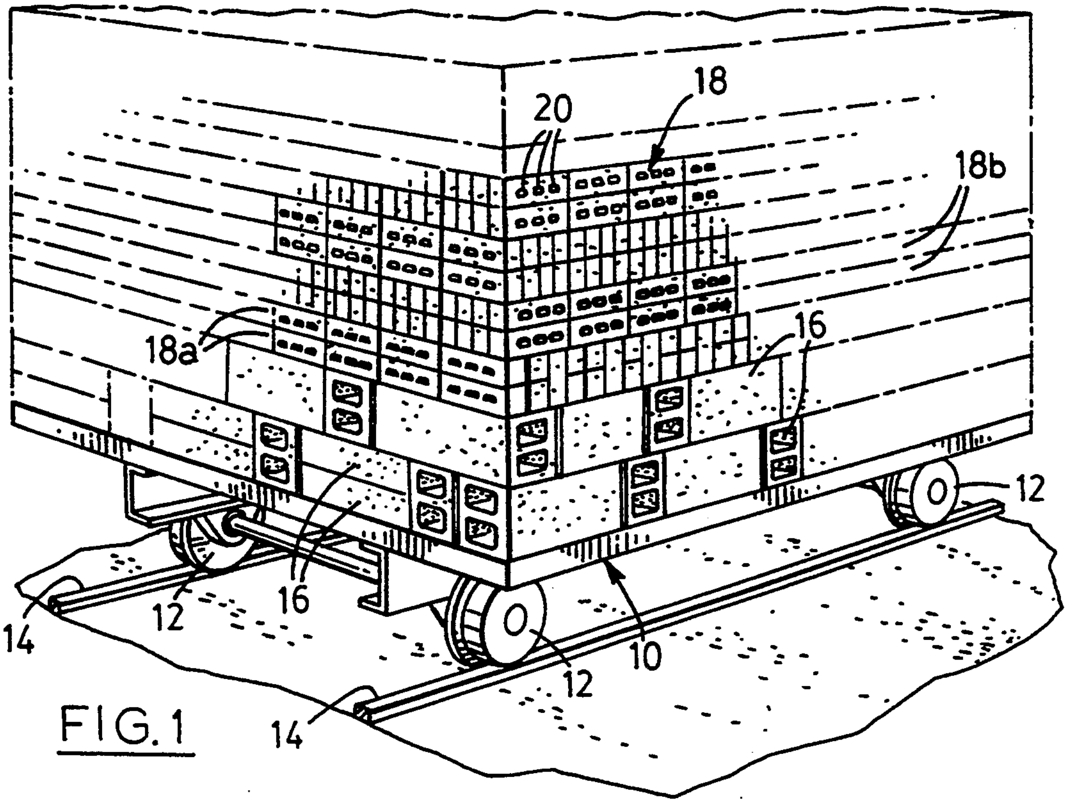
FIG. 1 is a perspective view of part of a loaded kiln car, illustrating the arrangement of the stack, thereon, wherein the cores of at least one bottom set (two layers) of the green brick preforms have smaller core holes than the upper sets.
Figure 2:
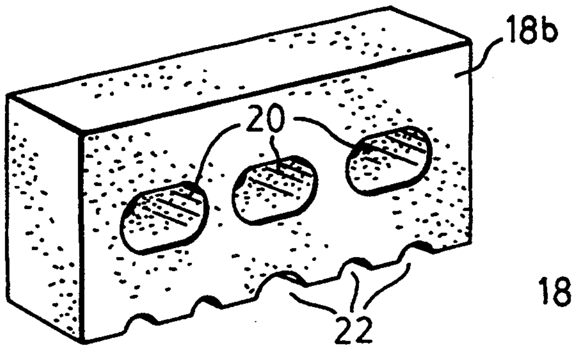
FIGS. 2 and 3 are perspective views of bricks with respectively larger and smaller core holes.
Figure 3:
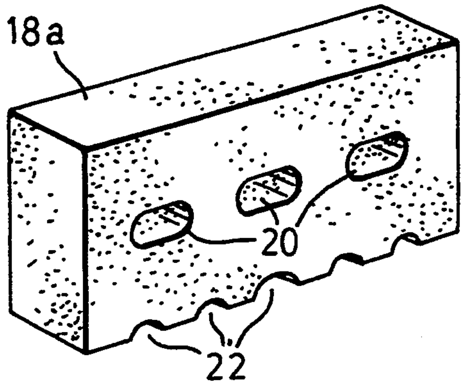

Referring now to FIG. 1, a wheeled metal kiln car 10 is mounted on flanged wheels 12 so as to be movable on rails 14 within the drier and firing kiln (not shown). The metal floor of the car is covered with two protective layers of high temperature resistant refractory blocks 16 and the layers of green brick preforms 18 are stacked on these blocks 16 in a predetermined pattern with passage between them to provide as far as possible for uniform firing of the bricks as the car moves through the drier and kiln. Each brick preform is provided with a plurality, three in this instance, of transversely spaced core holes 20 that extend between the two load-bearing faces and, as illustrated by FIGS. 1-3, the core holes of the bottom two layers (**18*a* in FIG. 1) are made substantially smaller than those of the remaining upper layers (18*b* in FIG. 1). Typically the upper layers will have the maximum permissible coreing area of about 24–25% of the total, while the bottom layers will be cored in the range 13–18%. As is frequently done with this type of brick one longer edge that in use will be part of an inner wall face is provided with a plurality (five in this example) of shallow parallel grooves 22 extending parallel to the core holes 20** so that when stacked on the kiln car the hot kiln gases have access between the preforms for more uniform firing. These grooves form part of the allowable cored area.

Figure 4:
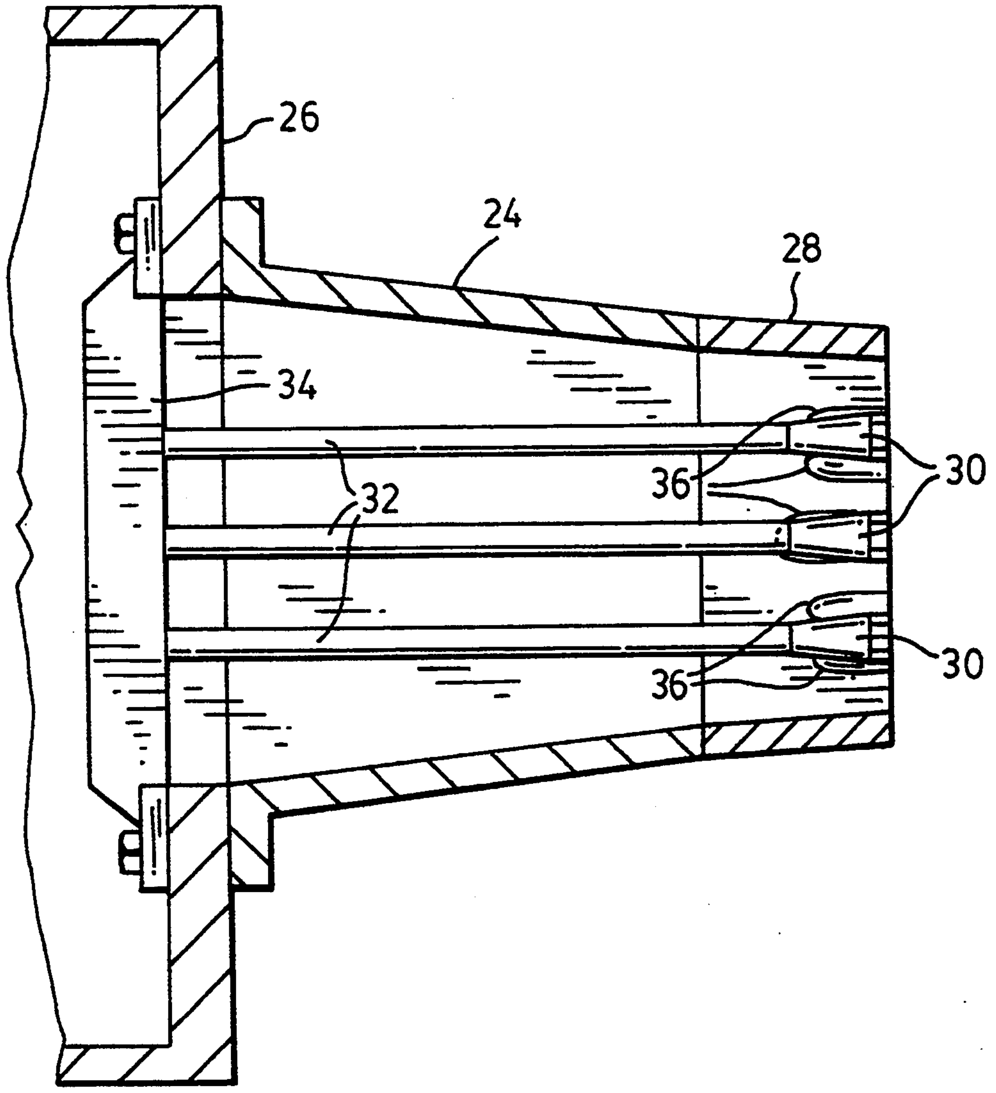
FIG. 4 (PRIOR ART)
FIG. 4 is a simplified transverse cross-section through a prior art brick clay extrusion nozzle to illustrate the shape and mounting of the core-hole producing cores as used hitherto.

In the prior art apparatus illustrated by FIG. 4 a nozzle member 24 is mounted on a mounting member 26 adjacent to the the outlet of a helical screw conveyor (not shown), which forces the clay mixture through a rectangular-shaped shaper cap member 28. The core holes 20 are formed by fixed core members 30 attached by respective connecting rods 32 to a narrow bridge member 34 attached to the mounting member 26, while the grooves 22 are formed by protruding ridges 36 on the respective inner wall of the outlet member 28.

Figure 5:
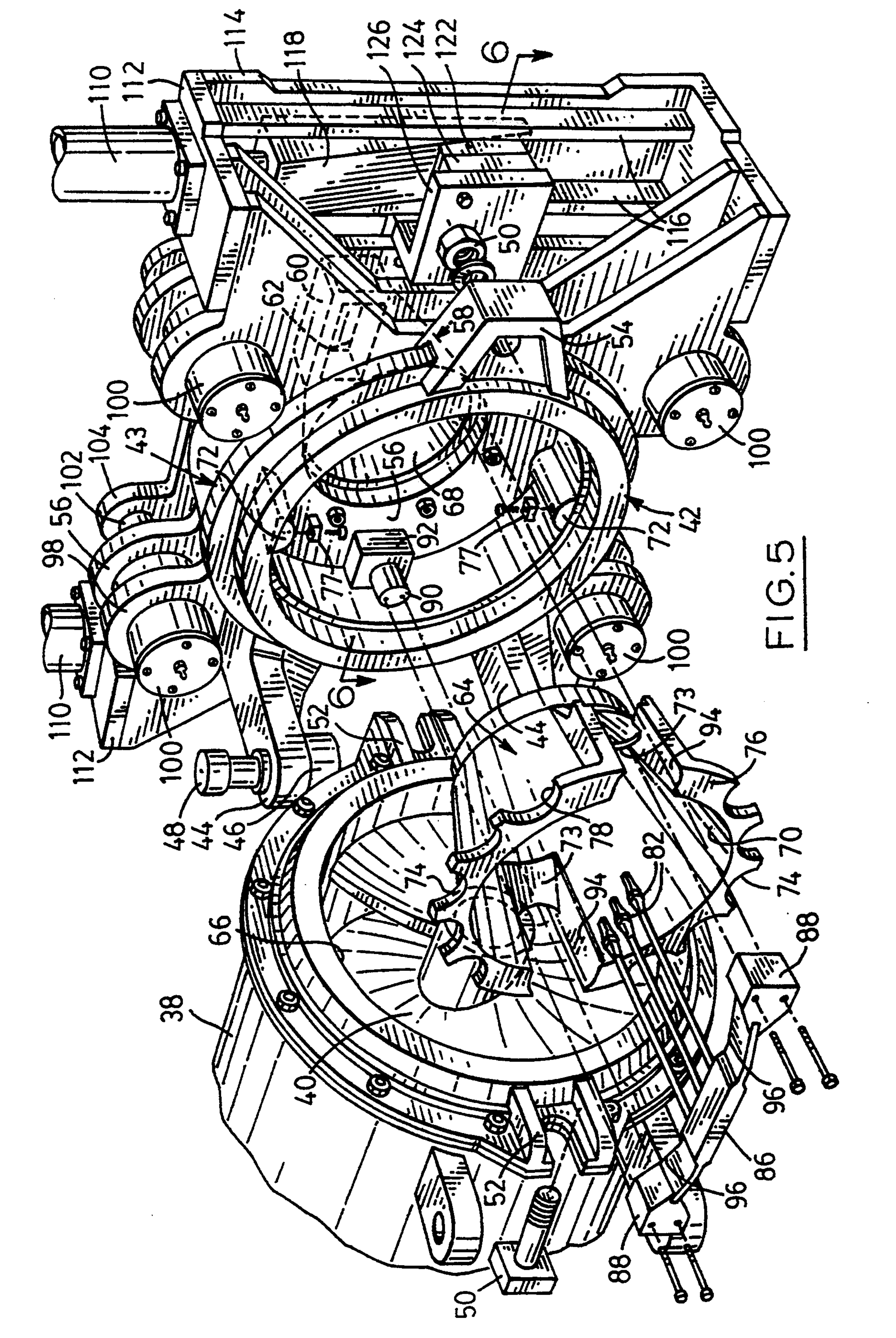
FIG. 5 is a perspective and partly exploded view of the discharge end of a clay extruder together with the variable core hole producing nozzle of the invention.
Figure 6:
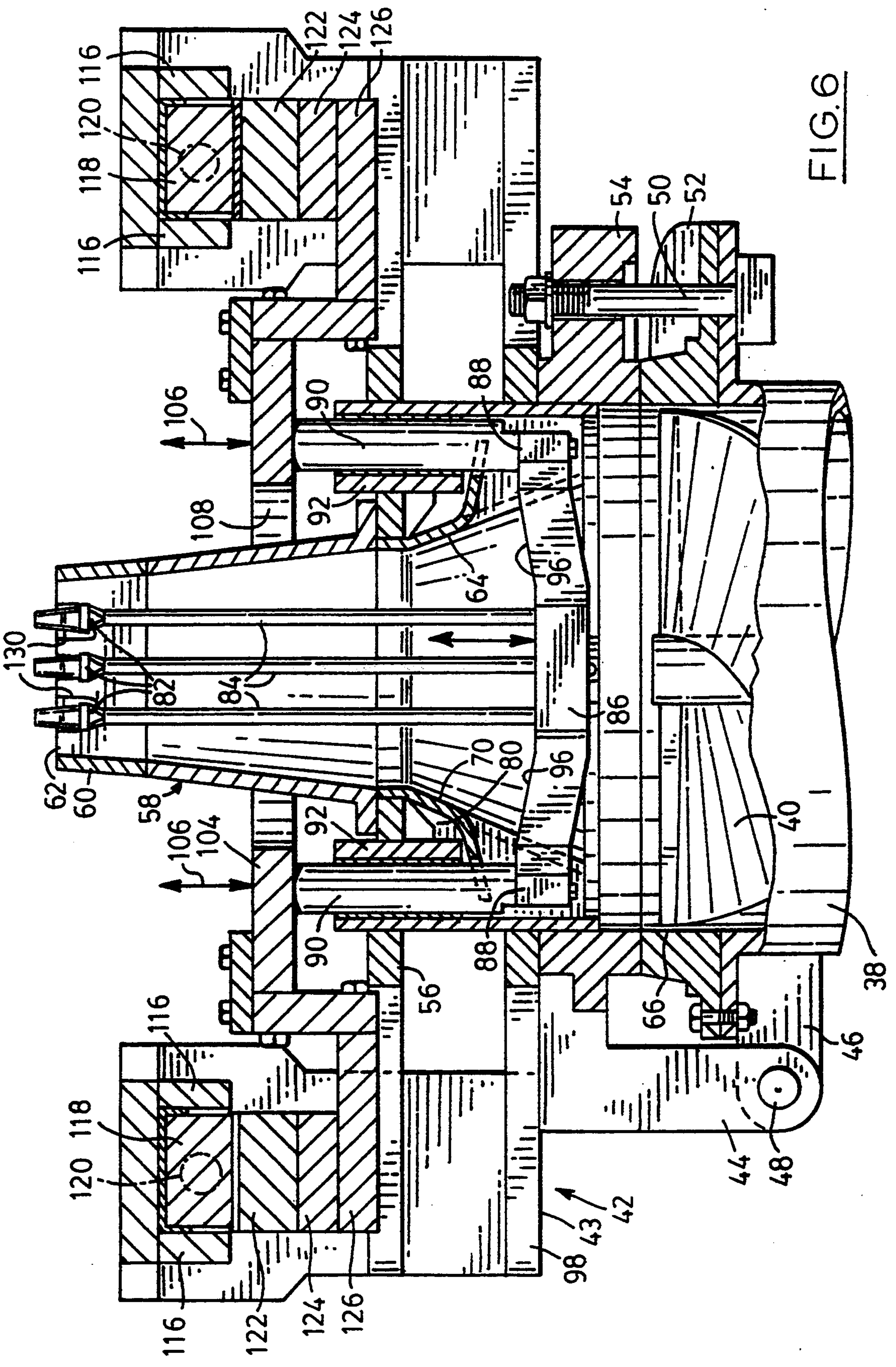
FIG. 6 is a cross-section in plan from above, taken on the line 6—6 in FIG. 5.

In a first embodiment illustrated by FIGS. 5–10 the variable coring nozzle structure of the invention is attached for convenience of mounting, access and service to a "door" 42 at the outlet end of a screw conveyor comprising a barrel 38 and a helical screw 40. The nozzle structure comprises a cylindrical main body member 43 bolted to the door 42 which has hinge lugs 44 extending therefrom, cooperating with complementary hinge lugs 46 on the barrel 38 and hinge pins 48 to mount the door and nozzle for movement about a vertical hinge axis between an open position as shown in FIG. 5 and a closed position as shown in FIG. 6. The door and nozzle are held in the closed position by a bolt and nut 50 engaged in cooperating lugs 52 and 54 respectively on the barrel 38 and the door member 42.

The body member 43 has an front plate 56 to which is bolted a forwardly tapering die member 58 that terminates in a replacable rectangular shaper cap 60, having a rectangular outlet 62 from which emerges the extruded clay material in the form of a rectangular cross-section strip 63. A bridging taper member 64 is provided between the large diameter outlet 66 of the conveyor barrel 38 and the much smaller diameter inlet 68 to the die member 58, the inside surface 70 of the member 64 tapering smoothly and progressively between the inlet and outlet to maintain continuous, flow of the clay and smooth progressive compression thereof. It also assists in stabilizing the clay flow and rendering it more even throughout the body of moving clay. The taper member 64 is interposed between the conveyor body 38 and the die member 58 against longitudinal movement, and is held against rotational movement in the main body member 43 by the engagement of semi-circular cross-section key members 72 in registering semi-circular notches 74 in a radial flange 76 of the taper member. As additional security for when the nozzle structure is in the open position of FIG. 5 the taper member is held in place by retainers 77. The flange 76 is provided with a number of other notches 78 which during start-up permit the filling with clay of the space 80 between the inside wall of the main body member 43 and the outside wall of the taper member 64 so as to exclude air that might otherwise become entrained in the extruded strip and result in cracked bricks. This interposed stationary body of clay also supports the conical member against the pressure of the extruded clay and permits the conical member to be of much thinner and lighter construction than would otherwise be possible. It may be noted that it is the usual practice with this type of equipment to provide an oil ring surrounding the clay column as it moves into the die member 58, this ring applying a thin film of oil to the exterior of the column to minimize friction and wear; this oil ring is omitted from the drawings herein for clarity of illustration and since it forms no part of the present invention.

In this embodiment three transversely-spaced parallel core hole forming members are provided, indicated generally in the Figures by the reference 82 and described in more detail below. Each core member is mounted at one end of an elongated connecting rod 84, the other ends of the rods being fastened to the centre portion of a transversely-extending thin bridge member 86 that is mounted for longitudinal movement parallel to the direction of flow of the clay through the conveyor 38, the taper bridge member 64, the die member 58 and the shaper cap 60. The ends of the bridge members are connected respectively to two connector pieces 88 that are in turn connected to the ends of respective push rods 90 that extend through respective sleeve bearing members 92 that pass through the front plate 56. The connector pieces 88 move through slots 94 provided for that purpose in the taper bridge member 64. The slots 94 terminate in sills 73 which have a steeper angle than taper member 64 and extend from points adjacent to push rods 90 to the inner surface of taper member 64 prior to the end of the inner surface, the slots 94 being provided with generally tapering side walls so as to be wider at flange 76 and narrower at end sill 73, each slot also being narrower at outside surface adjacent to main body member 43 and wider at the inner cone shaped surface 70 of taper member 64. The width of the slots is such as to maintain clay flow throughout them. The sills 73 in co-operation with leading edges 96 on bridge member 86 provide a sweeping and compressing action that removes clay buildup ahead of bridge member 86 and properly welds older clay built up when the bridge member was in the back positon, into the general clay flow stream. In the absence of this sweeping and compressing action it is possible for hardened lumps of older clay to be entrained at the edges of the clay column, which subsequently may cause unacceptable surface voids at the ends of the resultant bricks. It is important to note that the leading edges 96 of the portions of the bridge member 86 between the centre portion and the connectors 88 are angled inwardly toward the centre portion to provide a sweeping action on the clay as the bridge member moves forward, and so that clay cannot become wedged between the bridge member and the interior of the taper bridge member slots 94 and eventually prevent its forward movement. It is found that the bridge member can be of quite substantial thickness since in the apparatus of the invention it is disposed much further back from the nozzle in order to accomodate the necessary longitudinal movement, and this distant placement reduces its effect upon the flow of clay downstream of it to a negligible value.

In this embodiment the means for moving the bridge member 86 longitudinally, and thus the core members 82, include a the plate 56 and longitudinally spaced, transversely extending support plate 98 extending from the main body member 43. These support members carry four spaced sleeve bearing members 100 (FIGS. 5 and 11 only) each of which mounts a rod 102 for longitudinal movement parallel to the longitudinal movement of the bridge member 86. The four rods 102 in turn mount a cross-head support plate 104 for parallel longitudinal movement (arrows 106 in FIG. 6) with the plate parallel to the support members 56 and 98, the plate 104 having a central aperture 108 through which the die member 58 protrudes. The forward movements of the bridge member 86 and the cross-head plate 104 are produced by the pressure of the forwardly-moving clay, and the rearward movements when required are produced by the operation of two automatically controlled hydraulic motors 110 mounted on base plates 112 fastened to the support members 56 and 98 and also to respective vertical members 114, the latter supporting transversely-spaced guideways 116 between which move respective wedges 118 fastened to the ends of respective pistons 120 of the two motors 110. The rear sloping faces of the two wedges engage complementary sloping faces of two replacable wedge follower members 122 attached through spacer members 124 to arm members 126 attached to respective vertical edges of the cross-head plate 104. Thus, as the wedges 118 are forced downward by the motors 110 the arm members 126 and the cross-head plate are forced backward, carrying with them the push rods 90 and the bridge member 86. As will be described below the hydraulic motors 110 need only be operated while small core hole preforms are produced, which constitute only about 11–15% of the total production, and the mechanical advantage provided by the wedges enables the relatively large forces required (about 50 tons) to be provided by two relatively small and compact hydraulic motors (e.g. 10.0 cm diameter operating at about 70 Kg.sq.cm (4 in diameter at 1000 p.s.i.).

A typical structure for the core hole forming members 82 and their mode of operation are illustrated by FIGS. 7–10 to which reference is now made. Each member 82 is attached to its respective support rod 84 by a single central bolt 128. As in the prior art apparatus the shaper cap 60 is provided on one of its longer internal faces with five longitudinal ridges 130 in order to form respective grooves 22 in the extruded strip and in the resultant bricks.

Figure 9:
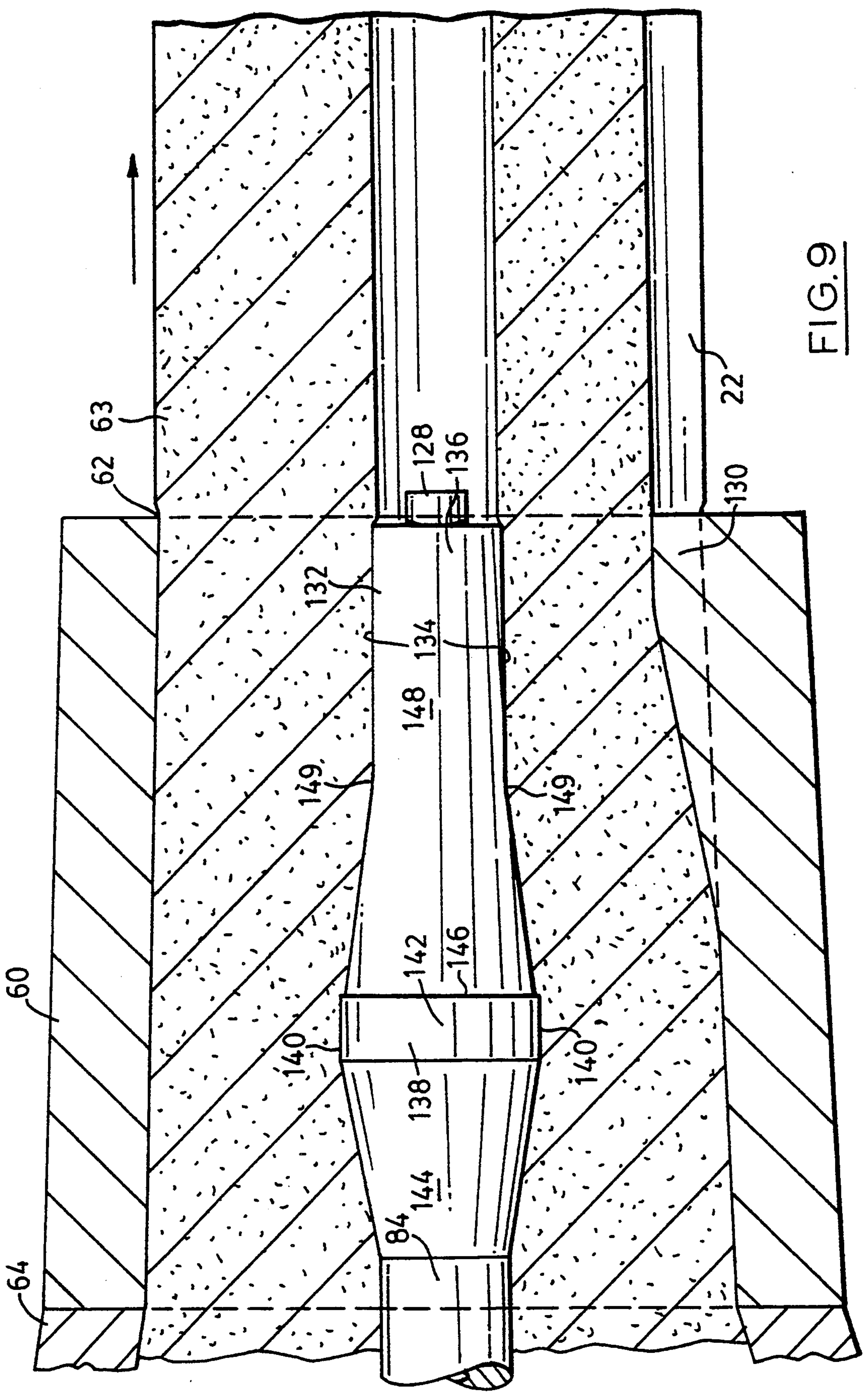
FIG. 9 is a vertical cross-section through the extrusion nozzle and a core to show their relative position for the production of smaller cored green bricks.
Figure 10:
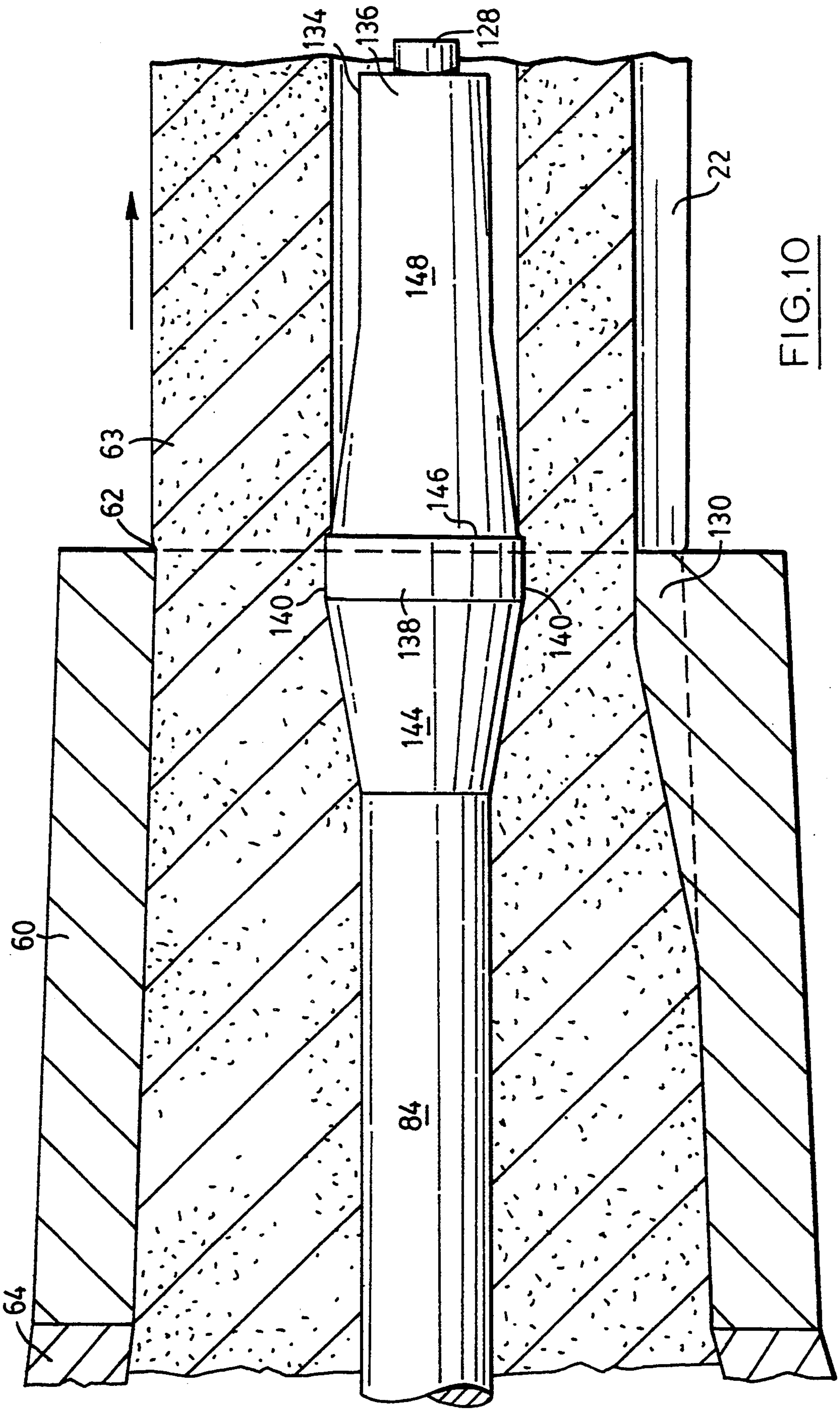
FIG. 10 is a vertical cross-section similar to FIG. 9 to show the relative positions of die and core for the production of larger cored green bricks.

Each member 82 in this embodiment comprises a first downstream portion 132 at its downstream end which is of generally rectangular transverse cross-section, the longer sides 134 being straight and parallel, while the shorter sides 136 are rounded and convex outwards, this first portion being of the shape required to cooperate with the shaper cap 60, and particularly with the outlet 62, as illustrated by FIG. 9, to form an approximately rectangular longitudinal core hole of the required smaller size. Each member also comprises a second upstream portion 138 adjacent to its upstream end, which is of similar shape to the first portion 132, having straight longer sides 140 and outwardly convex rounded sides 142, this second portion being of the shape required to cooperate with the shaper cap 60, and particularly the outlet 62, as illustrated by FIG. 10, to form a longitudinal core hole of corresponding shape and of the required larger size. Thus, with the motors 110 retracted and the member 84 consequently in the forward position of FIG. 10 relative to the nozzle outlet 62 a large size core hole is produced. If at an appropriate point in the production of the strip 63 the motors 110 are operated the member is withdrawn upstream until the second portion 138 is now too far from the nozzle outlet 62 to affect the size of the hole, and its production is now performed by the smaller size first portion 132, as shown in FIG. 10. The difference between the two sizes is such that the smaller first portion extends freely inside the larger hole with a substantial clearance all round while the larger core hole is being produced. When sufficient smaller hole green performs have been produced the output of motors 110 is reversed, whereupon the pressure of the advancing clay returns the core member to the forward position as described above. There will be transition periods as the core member is moving both forward and backward during which a small number of green brick preforms will be produced that nave holes intermediate between the two desired sizes, but these can be utilised as large hole preforms and any losses involved are negligible, compared to the potential savings in the number of usable fired bricks that are obtained. The shape of the tapered intermediate section is made such that the swell size of the strip 63 is maintained as closely the same as possible during the forward and backward movement of the core 82.

The continuous production from a single extruder of satisfactory bricks having either large or small core holes has proven to be unexpectedly difficult owing to the particular conditions that are encountered. The extruder barrel 38, whether employing a piston or helical screw, will for practical considerations usually be cylindrical, and the resultant cylindrical column of clay is compressed radially non-uniformly so as to be extruded with a rectangular cross-section. The possibility then exists if care is not taken that the side portions of the extruded strip will be more highly compressed than the centre portion, resulting in green bricks that are of non-uniform hardness, which leads to cracking in the fired bricks. It is found that as the strip 63 exits from the nozzle outlet 62 and the compression pressure is released there is an inevitable expansion of the clay with the strip outer surfaces moving slightly outwards and the hole inner surfaces moving slightly inwards. With the smaller holes there is a greater quantity of clay around them which will expand more upon release; if the expansion outwards is too great the resultant bricks may be oversize and be of different texture and for these reasons be unsaleable. It is essential therefore to be able to obtain at all times a sufficiently uniform compression and subsequent expansion for the bricks to be within acceptable limits. Non-uniform compression and expansion will also result in correspondingly non-uniform clay compaction which will increase the possibility of cracked and damaged bricks.

It will be seen therefore that the presence of the progressively tapered bridging member 64 between the extruder outlet and nozzle inlet is desirable in ensuring smooth progressive compression over the substantial distance between them. It also assists in reducing any flow interference that the bridge member 86 might produce, minimizing it by the time that the clay exits from the tapered member 64. The die member 58 is then sufficiently long to permit further compression with smooth transition from circular cross-section to the required rectangular cross-section, the final compression being provided by the shaper cap 60 until the clay exits finally from the orifice 62. The ridges 130 provided on the inside surface of the shaper cap also increase progressively in height over most of their length to provide a sufficiently progressive compression to the orifice 62..

Each core hole producing member consists of an upstream transitional portion 144 which has progressively changing radials, from circular to approximately rectangular with curved side edges in this embodiment, so as to provide for smoothly increasing compression of the clay as it passes from the respective cylindrical support member 84 to over the second upstream approximately rectangular portion 138. The member has immediately downstream of the portion 138 a narrow abruptly radially inwardly extending step 146 of just sufficient size to accomodate the inward expansion of the clay while the second portion 138 is operative (FIG. 10), yet not so large that it will disrupt the lamina flow while the first portion is operative (FIG. 9). It will also be noted that in operation the portion 138 is disposed to protrude slightly beyond the nozzle exit 62, thus holding back the contraction of the clay inwards into the core hole while expansion of the outer surface can take place; this outward expansion relieves the compression pressure so that thereafter the core hole contraction is lessened.

The side walls of the intervening transition portion 148 converge smoothly and progressively from the larger cross-section immediately in front of the step 146 to the smaller cross-section of portion 132. The top and bottom walls of a first upstream part of the portion on the other hand converge smoothly from the step 146 to a demarcation line 149 approximately at the mid point, and thereafter these walls are parallel. This second part of the portion 148 upstream of the portion 132 occupies from at least 30% to about 60% of the length of the portion 148. It is important that while the smaller portion 132 is operative (FIG. 9) any compression upstream produced by the second portion 138 is minimized, and that laminar uniform flow out of the shaper cap outlet be obtained, and there are three design factors which contribute to this. Firstly, the relatively uniform long length of the part of portion 148 just prior to the portion 132 gives the clay time to equalize the compression pressure over its transverse cross-section after it has flowed around the larger portion 138. Since the upper and lower surfaces just prior to the portion 132 are parallel the clay receives the maximum final compression possible between these parallel surfaces and the converging inner walls of shaper cap 60. Secondly, the inner walls of the shaper cap 60 are tapered downstream, in this embodiment at an angle of about so that in its inoperative position deep within the shaper cap the portion 138 is located in a part of the shaper cap of larger cross-section area than orifice 62, and it is the difference between these two areas that determines it successful re-compression is obtained when portion 132 at or adjacent to orifice 62 to equal the compression of the strip 63 when section 138 is operative. Thirdly, in its operative position the portion 132 is slightly upstream of the shaper cap outlet 62, so that the expansion inwards into the core hole of the larger quantity of clay around the smaller hole will begin before the expansion outwards of the outer surfaces. This permits the outwards expansion to be maintained at about the same value for the smaller core hole preforms as for the larger hole preforms, so that the fired bricks will be within the required standards as to size.

The physical and chemical properties of clays are not constant from source to source, and are also not necessarily constant even if taken from the same source, and parameters such as the extent of the protrusion of the second portion 138 beyond the shaper cap outlet 62, if any, and the extent to which the first portion 132 is retracted within the shaper cap from the outlet, if at all will need to be adjusted to suit the properties of the clay that is being processed. It may also be found with some clays that instead of the second portion 138 protruding beyond the shaper cap outlet it is retracted, and similarly instead of the first portion 132 being retracted it may protrude.

The application of the invention also facilitates the production of solid bricks known in the industry as "pavers". Because of the higher temperature firing required by these bricks only the top layers of the preforms can be of this type, while the remaining lower layers of the stack must be of cored type. Each core member 82 only need to be of a type able to produce a core hole of one corresponding size, while the means mounting and moving the core members are arranged to permit them to be withdrawn to a rearward position sufficiently into the shaper cap 60, or even beyond that into the die member 58, that the clay is now extruded from the shaper cap as solid rectangular column with no (zero) core holes. The die member is held in this withdrawn position for the length of time required to produce the number of green paver bricks that can be loaded onto the corresponding stack, and returned to its forward position to resume production of cored green bricks. Because of the difficulties of their production such paver bricks currently command a premium price of about three times the price of a standard cored brick.

Figures 7, 8:
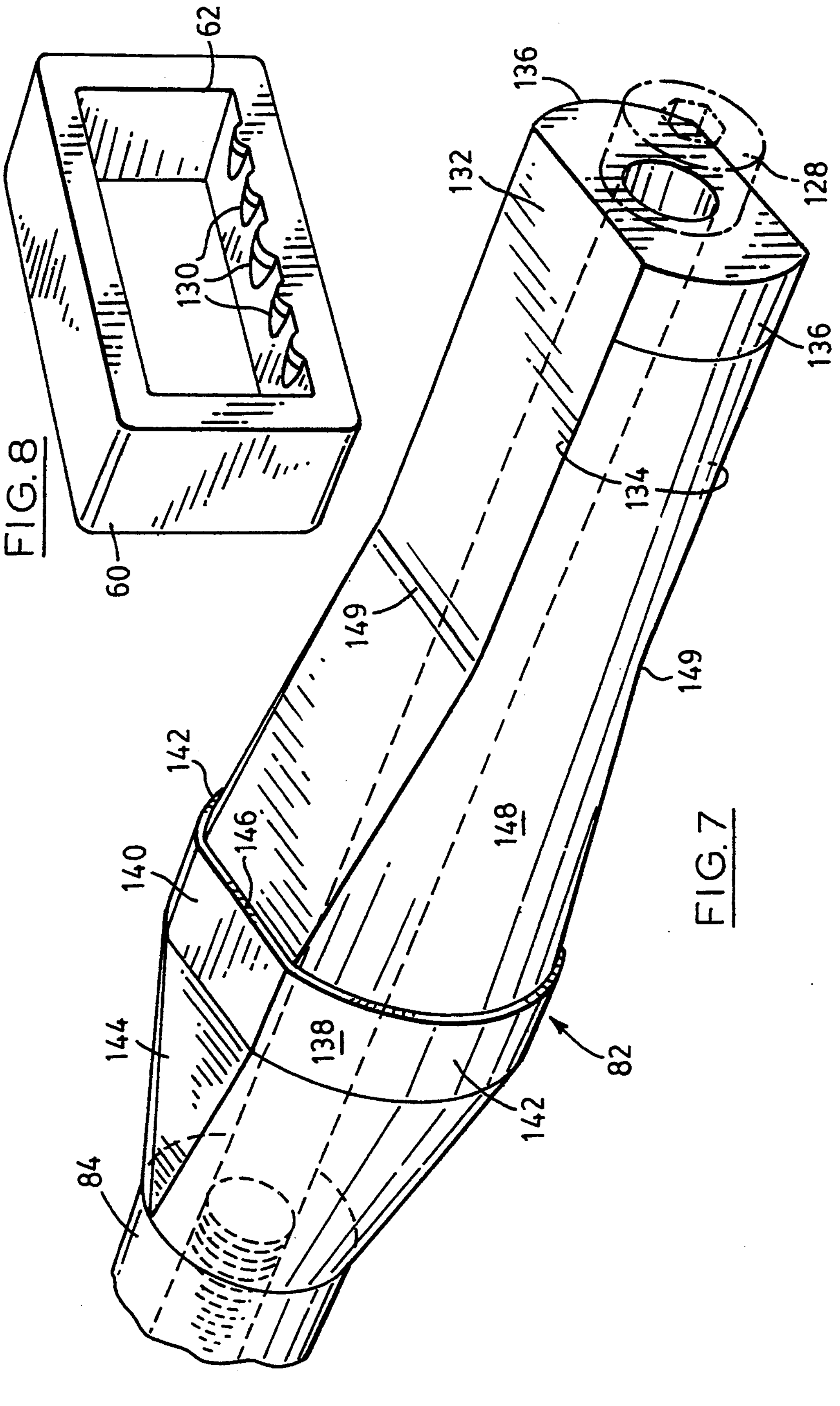
FIG. 7 is a perspective view to an enlarged scale of a core-hole producing core of the invention for producing at will two different sizes of core holes while the extruder is operative.
FIG. 8 is a perspective view similar to FIG. 7 of an extrusion nozzle shaper cap with which a plurality of the core hole producing cores are operative to produce the green strip from which the individual green brick preforms are cut.

It is also possible with the methods and apparatus of the invention to produce a mixed stack of three types of brick preform, namely with the bottom layers of small core hole size, the intermediate layers of large core hole size, and the top layers of zero core hole size, by longitudinal adjustment of die member as illustrated by FIG. 7 to the respective three positions.

Although the apparatus specifically described is for the production of bricks the invention is equally applicable to the production of hollow structural tiles.

The advantages of the possibility of such adjustment will be evident in that it can readily be accomplished by relatively simple changes to the support structure and the moving means for the core members, e.g. by changing the length of the intermediate portion 148 and/or the effective length of the support rod 84 and/or by changing the positions of the wedges 118 corresponding to the required locations for the core members. Although in this embodiment three core members are provided side by side across the width of the green bricks, and it is not usual except for paver bricks to use less than one central hole, since this enables the bricklayer to break the brick easily in half when required, it will be apparent that the invention is applicable to bricks employing more than three core holes, and arranged for example in two or more rows provided one hole is on the centre line. Since in this embodiment only three relatively large holes are provided it is found that they must be of the shape shown with flattened parallel top and bottom edges to meet the requirement for a minimum distance between the holes and the brick surfaces. The shape, size and number of the core holes is a matter of choice for the individual brick manufacturer determined by factors such as brick size, the amount of coring required, adequate extrusion, drying and firing of the preforms. Thus, the holes can be any geometric section such as square, rectangular, circular, elliptical, hexagonal. A larger number of smaller holes is preferred by some masonry contractors since it provides for more efficient use of motar. The number of flutes 130 is also a matter of choice and can vary from zero, when the brick is referred to as "smooth-back", up to any practical number for the size, use, and specification of brick.

In a specific example of a core opening die member 82 intended for the production of a standard fired clay brick measuring 22.54 cm (8.875 ins) by 9.21 cm (3.625 ins) by 7.14 in (2.8125 ins), and having three spaced core holes, the member 82 had an overall length of 14.4 cm (5.75 ins) and could vary in length from about 13.75 cm (5.5 ins) to about 15.625 cm (6.25 ins). The transitional portion 144 measured 2.5 (1 in) diameter at its face butting the connector 84 and was 3.75 (1.5 ins) long; its length could vary between about 2.5 cm (1 in) and about 5 cm (2 in). The second upstream portion 138 was 1.25 cm long (0.5 in) and could vary between zero and about 1.6 cm (0.625 ins); its transverse dimensions are relatively fixed owing to the need to obtain the maximum permissible core hole area and it measured 4.375 cm (1.75 in) in width and 3.75 cm (1.5 in) in height. The step 146 had a height of 0.117 cm (0.047 in). The intermediate portion 148 of the member measured 8.125 cm (3.25 in) in length and could vary in length from about 5.0 to about 8.75 cm (about 2 to about 3.5 in). The minimum length required between the two portions is that needed to allow recompression of the clay after it has passed the second upstream portion 138.

The relative proportions of the intermediate tapered portion 148 have been given above. The first downstream portion 132 is of the same length as the second portions 138 and its length can vary within the same limits; its transverse dimensions also are relatively fixed owing to the desire to obtain a specific core hole area and it measures 3.75 cm (1.5 in) in width and 2.5 cm (1 in) in height. Preferably the entire core member is of a high abrasion resistant material such as a high temperature fused ceramic, or it can be constructed of tool steel with the portions 132 and 138 of such ceramic and so as to be repalaceable. In this particular embodiment with the clay composition with which it was tested the first portion 132 was recessed about 0.156 cm (0.0265 in) while the second portion protruded by 0.31 cm (0.125 in). With the application of the invention it was found possible to reduce the quantity of non-saleable brick from about 4.5% to about 1.2%; it will be noted that the output of a large brick making plant can be of the order of 150 million bricks per year, so that this represents a saving of about 5 million bricks per year, valued at current rates at about S1.25 million Canadian.

Figure 11:
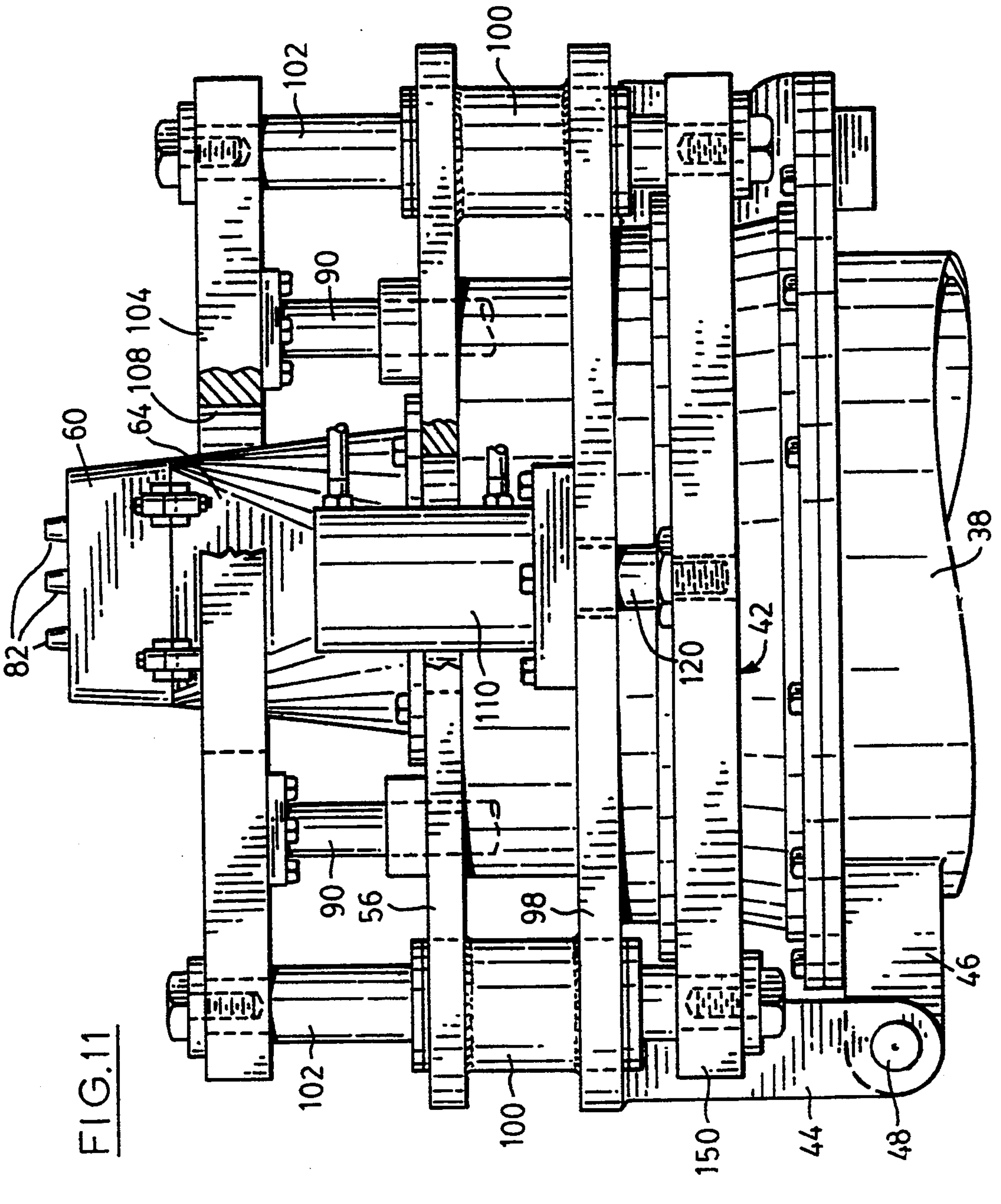
FIG. 11 is a plan view from above of another core hole producing nozzle which is a second embodiment of the invention.

FIG. 11 illustrates an alternative motor means for moving the core guide members and the same reference numbers will be used for similar parts, wherever that is possible. In this embodiment the four support rods 102 extend rearwards through the support members 56 and 98. The two upper rods 102 are connected by a cross-bar connector 150 which is moved in the required back and forth motion by a respective hydraulic motor 110; the two lower rods (not shown) are moved by a respective hydraulic motor (not shown); the two motors are made to operate in unison by a hydraulic divider and the mechanical connection provided by the cross-head connector plate 104. Since the two motors drive the bridge member 86 directly they must be sufficiently powerful to do this, without any mechanical advantage from the connecting linkage.

I claim:

1. Apparatus for use in the production of bricks and the like and for use in combination with an extruder conveyor having an outlet for clay material from which green preforms of the bricks and the like are to be made, the apparatus comprising:

a nozzle member having a nozzle inlet and a nozzle outlet, the nozzle member being connectable to an extruder conveyor outlet for the extrusion through the nozzle outlet of a continuous strip of clay which subsequently is divided into individual green preforms;

a core opening die member mounted in the nozzle member for longitudinal movement therein, the member being adapted to produce when in a second position at or adjacent to the nozzle outlet a core hole of corresponding size and when in a first position upstream of the second position to produce a core hole of corresponding size, which may be zero; and motor means connected to the core opening die member for producing longitudinal movement thereof between the first and second positions at which its produces the core holes of the respective different sizes, said motor means comprising a cross-head member through which the nozzle member protrudes, bearing means mounting the cross-head member for longitudinal movement parallel to the direct of movement of the clay, connecting means connecting the cross-head member to the core opening die member, and a motor operable to effect said longitudinal movement of the cross-head member.

2. Apparatus as claimed in claim 1, wherein the core opening die member has a first downstream portion adapted to produce when in the first position at or adjacent to the nozzle outlet a core hole of smaller size and a second upstream portion longitudinally spaced from the first downstream portion and adapted when in the second position at or adjacent to the nozzle outlet to produce a core hole of larger size.

3. Apparatus as claimed in claim 2, and including a conical intermediate connecting member upstream of the nozzle inlet, said intermediate connecting member having an inlet for receiving clay from a conveyor outlet and an outlet at the nozzle inlet, and being of progessively decreasing transverse cross-section clay flow area from the its inlet to its outlet maintaining corresponding flow therein of the clay.

4. Apparatus as claimed in claim 1, wherein each core opening die member is connected at a connection point to a transversely-extending bridge member connecting the die member to the motor means, and wherein portions of the bridge member between its outer ends and the points of connection of the die members are inclined forwardly inwards toward each other to prevent blocking of corresponding movement of the bridge member by interposed clay.

5. Apparatus as claimed in claim 3, wherein each core opening die member is connected at a connection point to a transversely-extending bridge member connecting the die member to the motor means, and wherein the conical connecting member is provided with respective longitudinal slots in which the ends of the bridge member move, the slots having tapering side walls and angled end slits to sweep and compress clay ahead of the bridge member into the moving clay column.

6. Apparatus as claimed in claim 1, wherein the motor means comprises motor operated wedge means connected to the cross-head member to move it in the said longitudinal movement.

7. Apparatus as claimed in claim 1, wherein the motor means comprises hydraulic motor means connected to the cross-head member to move it in the said longitudinal movement.

8. Apparatus as claimed in claim 1, wherein the core opening die member comprises a first downstream portion of transverse cross-section, size and shape to produce when positioned at or adjacent to the nozzle outlet a core hole of smaller size;

a second upstream portion longitudinally spaced from the first downstream portion and of transverse cross section, size and shape to produce when positioned at or adjacent to the nozzle outlet a core hole of larger size; and an intermediate portion connecting the said first and second portions and of progressively increasing cross-section area upstream from the first to the second portion.

9. Apparatus as claimed in claim 8, wherein the internal surface of the nozzle member is tapered toward the nozzle outlet, whereby with the core opening die member retracted therein for the first downstream portion to be operative the second upstream portion is disposed in a part of the nozzle of larger cross-section to thereby reduce its effect on compression of clay moving past the second portion.

10. Apparatus as claimed in claim 8, wherein the core opening die member includes a radially inwardly extending step between the second portion and the intermediate portion to accomodate inward expansion of the clay as it leaves the nozzle exit with the second portion operative to produce the core hole.

11. Apparatus as claimed in claim 8, wherein the side walls of the die core member intermediate portion converge progressively and continuously from the second to the first portion, and the top and bottom walls are of substantially constant distance apart for a first part of their length from the first portion and thereafter diverge progressively to the second portion.

12. Apparatus of claim in claim 8, wherein the core opening die member includes an upstream transitional portion between its upstream end and the second portion, the transitional portion being of progressively increasing dimension on all radials from its upstream end adapted to be fastened to a support member to the second portion.

13. Apparatus according to claim 1 wherein said motor operates to effect longitudinal movement of the core opening die member from the second position to the first position, and pressure of clay in the nozzle member effects movement of the core opening die member back to the second position.

* * * * *